(12) United States Patent
Rudelic

(10) Patent No.: US 7,117,326 B2
(45) Date of Patent: Oct. 3, 2006

(54) TRACKING MODIFICATIONS TO A MEMORY

(75) Inventor: John C. Rudelic, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 355 days.

(21) Appl. No.: 10/606,450

(22) Filed: Jun. 26, 2003

(65) Prior Publication Data

US 2004/0268064 A1 Dec. 30, 2004

(51) Int. Cl.
*G06F 12/00* (2006.01)
(52) U.S. Cl. .................................... 711/162
(58) Field of Classification Search .................. None
See application file for complete search history.

(56) References Cited

U.S. PATENT DOCUMENTS

| | | | |
|---|---|---|---|
| 5,860,124 A * | 1/1999 | Matthews et al. ......... 711/165 |
| 6,549,457 B1 | 4/2003 | Srinivasan et al. ..... 365/185.03 |
| 6,769,053 B1 * | 7/2004 | De Jong et al. ............ 711/156 |
| 2002/0099904 A1 * | 7/2002 | Conley ....................... 711/103 |
| 2002/0112134 A1 * | 8/2002 | Ohran et al. ................ 711/162 |
| 2003/0053333 A1 | 3/2003 | Rudelic et al. ........ 365/185.03 |
| 2003/0143971 A1 * | 7/2003 | Hongo et al. ............... 455/313 |
| 2004/0128594 A1 * | 7/2004 | Elmhurst et al. ........... 714/718 |

* cited by examiner

Primary Examiner—Mano Padmanabhan
Assistant Examiner—Duc T Doan
(74) Attorney, Agent, or Firm—Trop, Pruner & Hu, P.C.

(57) ABSTRACT

In one embodiment of the present invention, a method includes setting an update to data of a memory to a valid status, and changing an original version of the data to a backup status.

11 Claims, 4 Drawing Sheets

TRACKING MODIFICATIONS TO A MEMORY

BACKGROUND

Nonvolatile memory filesystems such as a flash memory are used to store persistent data. The nature of a flash memory allows a filesystem media manager to write data in one direction (i.e., bring data from a logic 1 to a logic 0) before an erase operation on a memory block is required. Data is typically marked as valid when it is created and is marked invalid when updated with a newer copy that becomes the valid copy, resulting in a memory device that contains a single valid copy of data and many copies of invalid data (or portions thereof), until an erase operation is performed on the memory block.

A transacted database tracks updates in groups of operations on data. For an example, a business card database may include entries relating to addresses, phone numbers, fax numbers, and the like. A partial update of information in an entry is problematic, as a modification is only saved if all of the relevant data has been updated, and a database commit operation occurs. If only a partial update was completed, the system unwinds the modification to the original data via a database abort operation. As data is updated, the database may copy the original data and a string of operations to a cache to support a transaction capability. Similarly, a transacted filesystem may incur significant additional overhead to maintain a transaction log independent of the memory device. A need thus exists to track data modifications without such overhead.

DETAILED DESCRIPTION

Figure 1:
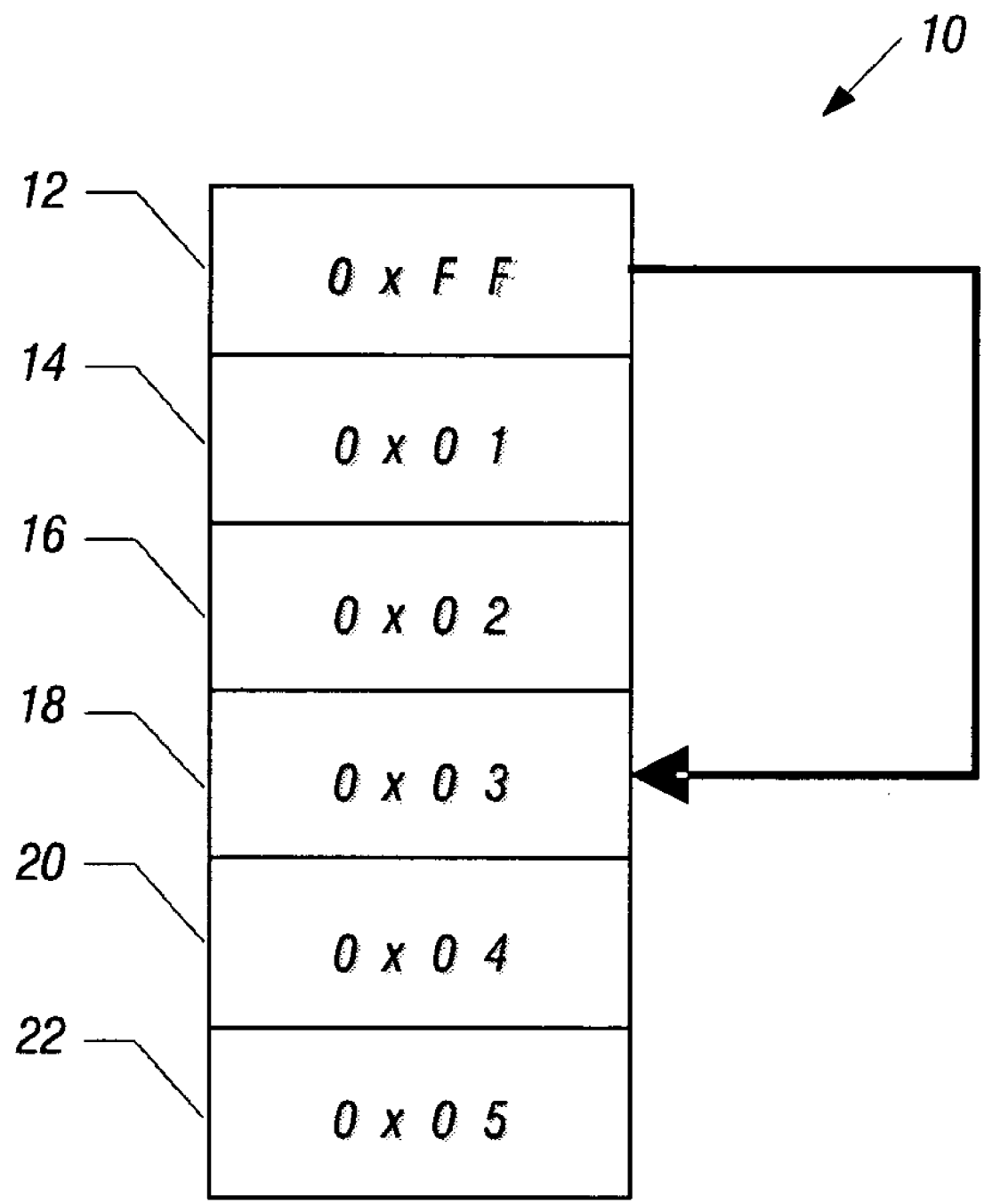
FIG. 1 is block diagram of a memory block having modifications to a data object in accordance with one embodiment of the present invention.

Referring to FIG. 1, shown is a block diagram of a memory block having a number of modifications to a data object in accordance with one embodiment of the present invention. As shown in FIG. 1 a memory block 10 includes data objects 12, 14, 16, 18, 20 and 22. Further shown in FIG. 1, each of these data objects has a count number associated therewith. For example, data object 12 has a count of 0xFF associated therewith. In the embodiment shown in FIG. 1, a count of 0xFF corresponds to a most recent modification to the data object (i.e., current data).

Similarly in the embodiment of FIG. 1, a first modification made to the data object may correspond to a count of 0x01 (i.e., data object 14); a second modification may be marked with a count of 0x02 (i.e., data object 16); a third modification may be marked with a count of 0x03 (i.e., data object 18) and so forth (e.g., a fourth modification having a count of 0x04 (i.e., data object 20) and fifth modification having a count of 0x05 (i.e., data object 22)). While discussed as modifications to a single data object, it is to be understood that in various embodiments, modifications of different data objects may be grouped together. More so, while discussed above with regard to specific numbers, the scope of the present invention is not limited in this respect, and a count may correspond to any number, symbol or other means to identify a modification sequence.

In one embodiment, a status field may be provided in a power-loss recovery (PLR) register associated with a data object. Status parameters may include, in certain embodiments, a valid status, a backup status, and an invalid status, as discussed further below. In certain embodiments, the count may also be included in the PLR register, although the present invention is not limited in this regard.

In the embodiment of FIG. 1, current data may be marked with 0xFF and each change from a baseline of the data may be maintained (e.g., via the count). When a change is selected to be baselined, only the most recent modification (e.g., the modification marked 0xFF) may be maintained. Further, if a transaction is to be unwound, the selected modification may be copied to a valid data unit and marked with a count of 0xFF, while all other modifications may be invalidated.

For example, as shown in FIG. 1, if a transaction is to be unwound such that a third modification existing at data object 18 is desired to be baselined, in one embodiment data object 18 may be copied to a valid data unit and marked with a count of 0xFF to indicate a valid status. Then, all other modifications may be invalidated.

Figure 2:
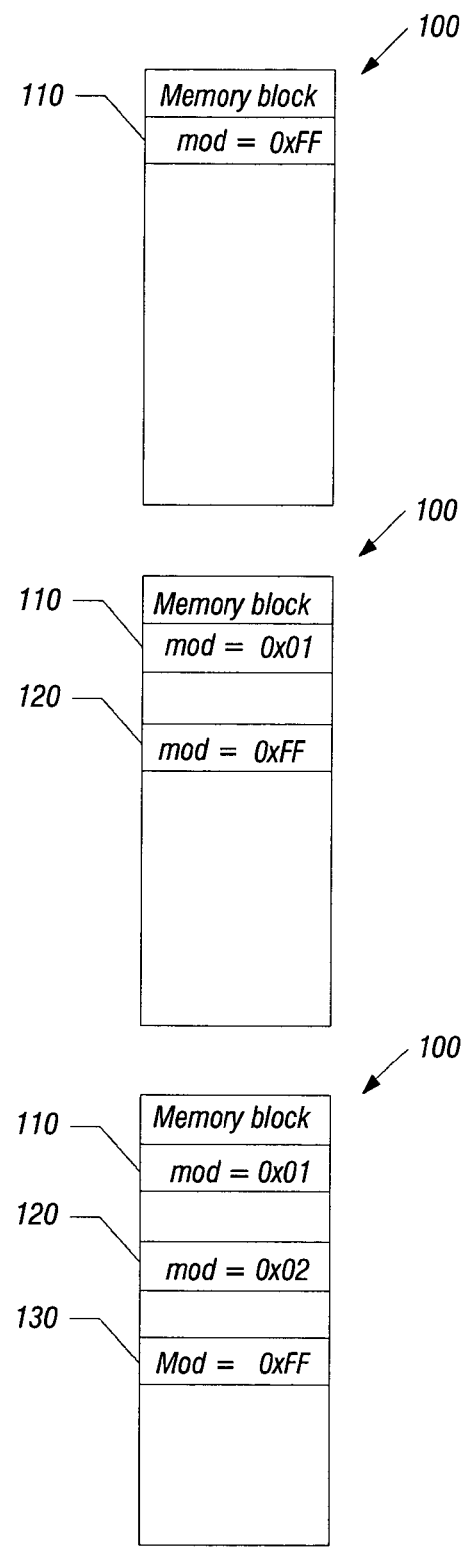
FIG. 2 is a block diagram of a modification operation in accordance with one embodiment of the present invention.

Referring now to FIG. 2, shown is a block diagram of a modification operation in accordance with one embodiment of the present invention. In FIG. 2, a memory block 100 is shown over time from the top to the bottom of FIG. 2. At a first time instant (shown at the top of FIG. 2), a data object is created (block 110) and the status of the object is valid, as shown by the count of 0xFF associated therewith. At a later time instant (shown in the middle of FIG. 2), modified data is written to memory block 120. The status of modified data 120 is valid, as indicated by the count of 0xFF associated therewith. Original data 110 is indicated with a backup status as shown by a count of 0x01 associated therewith.

As shown further in FIG. 2, at a next later time instant (shown at the bottom of FIG. 2), the data of the data object is modified again (block 130), and is provided with a valid status via a count of 0xFF. Further, block 120 is indicated with a backup status via a count of 0x02, and block 110 is indicated with a backup status via a count of 0x01.

In such manner, an improved transacted filesystem may be provided which may permit modification operations without the need for cache copies or use of extra memory spaces. In various embodiments, a backup status may be used to signal a reclaim task to not reclaim given data unit(s). Although a count is used to indicate a backup status in the above embodiment, the present invention is not so limited. For example in other embodiments, a different identifier may be provided in a PLR register or another location associated with the data object to identify its status.

Upon a commit or an abort instruction, any data entries marked with a backup status may be changed to an invalid status, which may permit those data entries to be later reclaimed via a reclaim operation.

Figure 3:
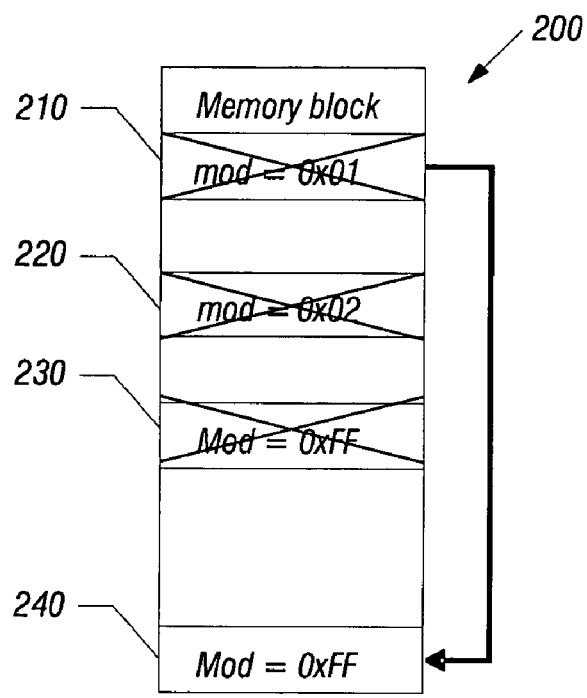
FIG. 3 is block diagram of an abort operation in accordance with one embodiment of the present invention.

Referring now to FIG. 3, shown is a block diagram of an abort operation in accordance with one embodiment of the present invention. As shown in FIG. 3, a memory block 200 includes original data 210, a first update 220, and a last update 230. Upon an abort of the database operation, each of blocks 210, 220 and 230 are invalidated (as represented by the X's), and original data block 210 is copied to a valid data unit 240, reinstating the original data, as shown by the count of 0xFF associated therewith.

Figure 4:
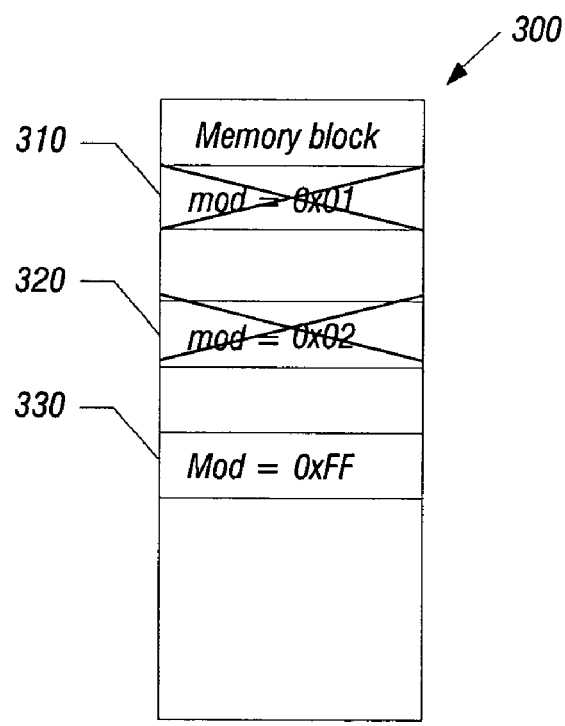
FIG. 4 is a commit operation in accordance with one embodiment of the present invention.

Referring now to FIG. 4, shown is a commit operation in accordance with one embodiment of the present invention. As shown in FIG. 4, a memory block 300 includes original data 310, a first update 320 and a last update 330. As shown in FIG. 4, original data 310 has a count of 0x01 associated therewith, first update 320 has a count of 0x02 associated therewith, while last update 330 has a count of 0xFF associated therewith, indicating it has a valid status. On a commit operation, all updates before last update 330 are invalidated (e.g., as represented by the X's through blocks 310 and 320). Then on a reclaim operation, the invalid data may be reclaimed and last update 330 validated.

In other embodiments, as modified data is entered into a memory block, original data may be invalidated and copied to a transaction cache or log. Then if a commit or abort operation occurs, the cached copy of the data may be reclaimed, and a reclaim operation may later reclaim invalid data in the primary memory block.

For example, during an abort operation in accordance with such an embodiment, modifications may be invalidated and the cached version of the original data may be copied to a valid data unit, thus reinstating the original data. Later, a reclaim operation may reclaim the invalidated blocks of memory and the cache contents. Similarly during a commit operation of such an embodiment, the last update to a memory block may be set with a valid status and cached copies of prior updates and original data may be invalidated along with those updates and original data in the memory block. Thus upon a next reclaim operation these blocks may be reclaimed.

Thus embodiments of the present invention may track modifications to data and allow a user to revert to an earlier version of the data as desired. By tracking modifications within a memory device as data is invalidated and modified, a transacted filesystem may be implemented. In an embodiment implemented in a flash device, flash operations may be leveraged with negligible overhead. By leveraging data within the flash device as it is invalidated, data does not need to be copied to a database or filesystem cache or log. That is, previous modifications may remain in the flash device associated with a modified or backup status. In certain embodiments, a performance advantage may thus be realized and may further allow a flash device to be dirtied at a slower rate by reducing the amount of data that is copied. While discussed in such an embodiment as a flash device, the scope of the present invention is not limited in this respect.

In certain embodiments, database systems and transacted filesystems may be supported within a flash device, and may incorporate management software that requires less processor utilization. In such manner, data units may be tracked within the management software explicitly to support applications such as databases and/or transacted filesystems without the need for additional software layers on top of a flash filesystem.

Embodiments may be used in connection with any storage of data in volatile or nonvolatile memory such as a flash device. Examples may include parameter/data storage and/or file management in a cellular telephone or file storage in a personal digital assistant (PDA), or the like, although the present invention is not limited in this respect.

Embodiments of the present invention may be performed in a variety of locations within or external to a storage system. For example, tracking logic may be implemented in logic circuits embedded inside a monolithic semiconductor memory device, or a software algorithm executed by a controller stacked with memory inside a multi-chip memory subsystem package. For example, in one embodiment an algorithm may be implemented in microcode of a flash memory device, such as within a coprocessor within the device. Alternately, a software algorithm may be executed by an external processor separate from the memory subsystem.

Embodiments of the present invention may be implemented in code and may be stored on a storage medium having stored thereon instructions which can be used to program a system, such as a wireless device to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs), erasable programmable read-only memories (EPROMs), flash memories, electrically erasable programmable read-only memories (EEPROMs), magnetic or optical cards, a silicon-oxide-nitride-oxide-silicon (SONOS) memory, a phase-change or ferroelectric memory, or any type of media suitable for storing electronic instructions.

Figure 5:
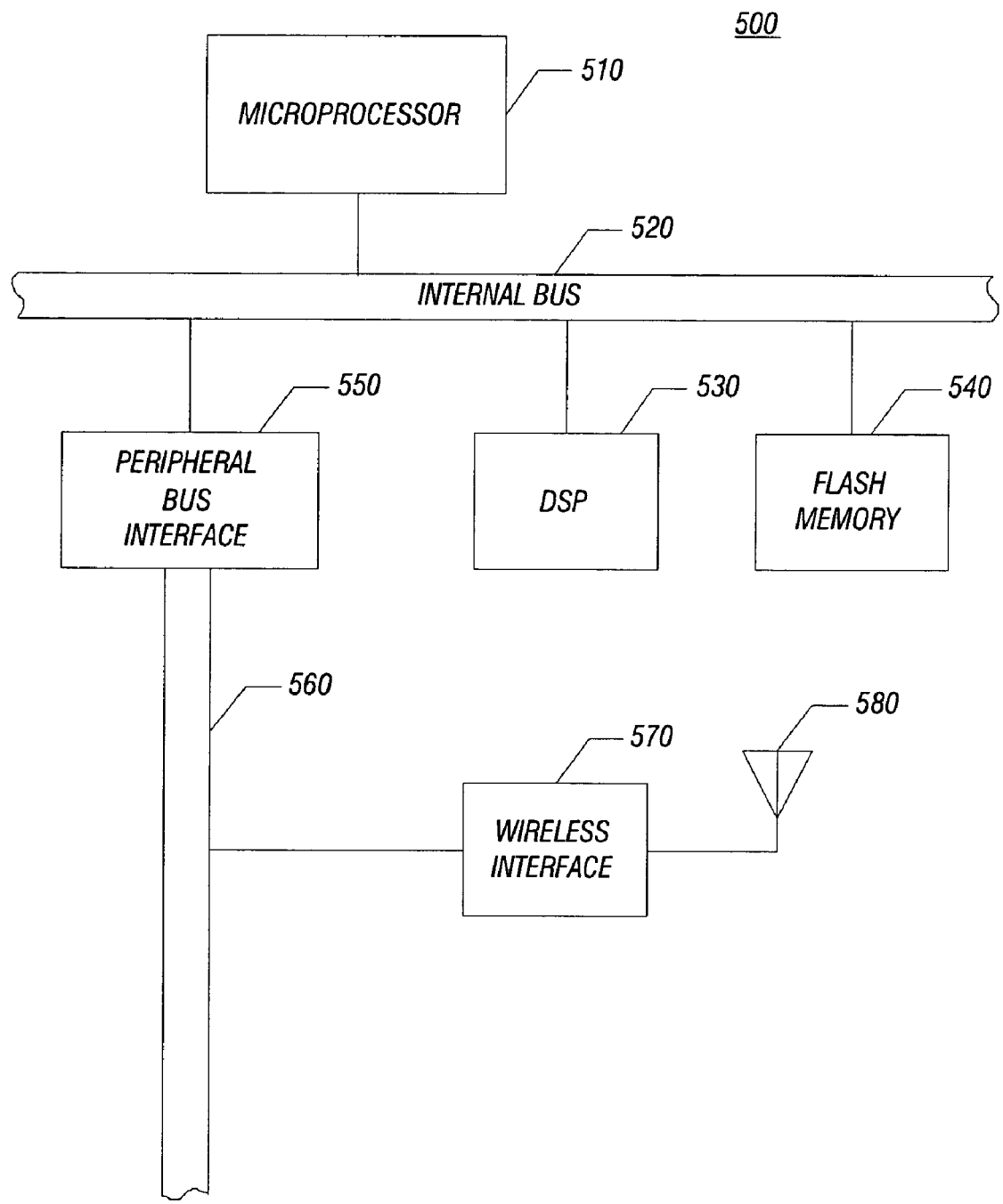
FIG. 5 is a block diagram of a system with which embodiments of the present invention may be used.

FIG. 5 is a block diagram of a wireless device with which embodiments of the invention may be used. As shown in FIG. 5, in one embodiment wireless device 500 includes a processor 510, which may include a general-purpose or special-purpose processor such as a microprocessor, microcontroller, application specific integrated circuit (ASIC), a programmable gate array (PGA), and the like. Processor 510 may be coupled to a digital signal processor (DSP) 530 via an internal bus 520. A flash memory 540 which may track and store data modifications in accordance with an embodiment of the present invention also may be coupled to internal bus 520.

As shown in FIG. 5, microprocessor device 510 may also be coupled to a peripheral bus interface 550 and a peripheral bus 560. While many devices may be coupled to peripheral bus 560, shown in FIG. 5 is a wireless interface 570 which is in turn coupled to an antenna 580. In various embodiments antenna 580 may be a dipole antenna, helical antenna, a global system for mobile communications (GSM) antenna or another such antenna.

Although the description makes reference to specific components of device 500, it is contemplated that numerous modifications and variations of the described and illustrated embodiments may be possible. More so, while FIG. 5 shows a block diagram of a wireless device, it is to be understood that embodiments of the present invention may be implemented in a system such as a personal computer, server, or the like. In such embodiments, a flash memory may be coupled to a Peripheral Component Interconnect (PCI) bus, as defined by the PCI Local Bus Specification, Production Version, Revision 2.1 dated in Jun. 1995, or other such bus.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
  associating a count value with a first modification to a data object, the count value indicative of a valid status; and
  thereafter associating the count value with a second modification to the data object.

2. The method of claim 1, further comprising associating the first modification with a second count value indicative of a backup status upon associating the count value with the second modification.

3. The method of claim 1, further comprising associating a second count value with an original version of the data object upon associating the count value with the first modification, the second count value indicative of a backup status.

4. The method of claim 3, further comprising invalidating the original version.

5. The method of claim 3, further comprising reinstating the original version via associating the count value with the original version if an abort operation occurs.

6. A machine-readable storage medium containing instructions that, if executed, enable a system to:
associate a count with a first modification to a data object, the count indicative of a valid status;
associate the count with a second modification to the data object;
associate the first modification with a second count indicative of a backup status when the count is associated with the second modification: and
associate the count wit a third modification to the data object and to associate the second modification wit a third count indicative of the backup status.

7. An apparatus comprising:
at least one storage device to store code to set an update to data of a memory to a valid status via association of a valid count value therewith and to change an original version of the data to a backup status via association of a second count value therewith in place of the valid count value, wherein the memory comprises a flash memory device; and
a coprocessor within the flash memory device to perform the code.

8. The apparatus of claim 7, further comprising second code to invalidate the original version if the update is committed.

9. The article of claim 6, further comprising instructions that when executed invalidate the first modification if the second modification or the third modification is committed.

10. The article of claim 6, further comprising instructions that when executed to reinstate the count with the first modification if an abort operation occurs.

11. The apparatus of claim 8, further comprising third code to reclaim a space in the flash memory device including the original version.

* * * * *

UNITED STATES PATENT AND TRADEMARK OFFICE
CERTIFICATE OF CORRECTION

PATENT NO. : 7,117,326 B2 Page 1 of 1
APPLICATION NO. : 10/606450
DATED : October 3, 2006
INVENTOR(S) : John C. Rudelic It is certified that error appears in the above-identified patent and that said Letters Patent is hereby corrected as shown below:

<u>Column 5:</u>
Line 24, "wit" should be --with--;
Line 25, "wit" should be --with--.

<u>Column 6:</u>
Line 18, delete "to".

Signed and Sealed this

Second Day of January, 2007

JON W. DUDAS
*Director of the United States Patent and Trademark Office*